United States Patent [19]

Bogner

[11] Patent Number: 5,102,166
[45] Date of Patent: Apr. 7, 1992

[54] DEVICE FOR THE VERTICAL ADJUSTMENT OF THE UPPER ANCHORAGE OR DEFLECTION POINT OF A SAFETY BELT SYSTEM

[75] Inventor: Ralf Bogner, Neuhausen, Fed. Rep. of Germany

[73] Assignee: Mercedes-Benz AG, Fed. Rep. of Germany

[21] Appl. No.: 615,284

[22] Filed: Nov. 19, 1990

[30] Foreign Application Priority Data

Nov. 21, 1989 [DE] Fed. Rep. of Germany ....... 3938612

[51] Int. Cl.⁵ ............................................ B60R 22/20
[52] U.S. Cl. .................................... 280/808; 297/483
[58] Field of Search ............... 280/808, 801, 802, 804; 297/468, 483

[56] References Cited

U.S. PATENT DOCUMENTS 4,173,357 11/1979 Jahn ................................... 280/808

FOREIGN PATENT DOCUMENTS 0277550 8/1988 European Pat. Off. ............ 280/808
3539399 5/1987 Fed. Rep. of Germany .
3713137 11/1988 Fed. Rep. of Germany .
2203629 10/1988 United Kingdom .

Primary Examiner—Charles A. Marmor
Assistant Examiner—Karin Tyson
Attorney, Agent, or Firm—Evenson, Wands, Edwards, Lenahan & McKeown

[57] ABSTRACT

A device for the vertical adjustment of the upper anchorage or deflection point of a safety belt system as a function of the longitudinal displacement of an associated motor vehicle seat. Displacement of the seat is transmitted by a cable coupled to a guide rail and a slider vertically displaceable therein between a lower and an upper stop and accommodating an attachment fitting or sash guide. Vertically correct adaptation, even to persons sitting relatively far back and having a relatively small upper body is achieved by an arrangement which permits further cable movement, directed counter a spring force, when the slider runs up against the upper stop and the motor vehicle seat is pushed further back.

3 Claims, 1 Drawing Sheet

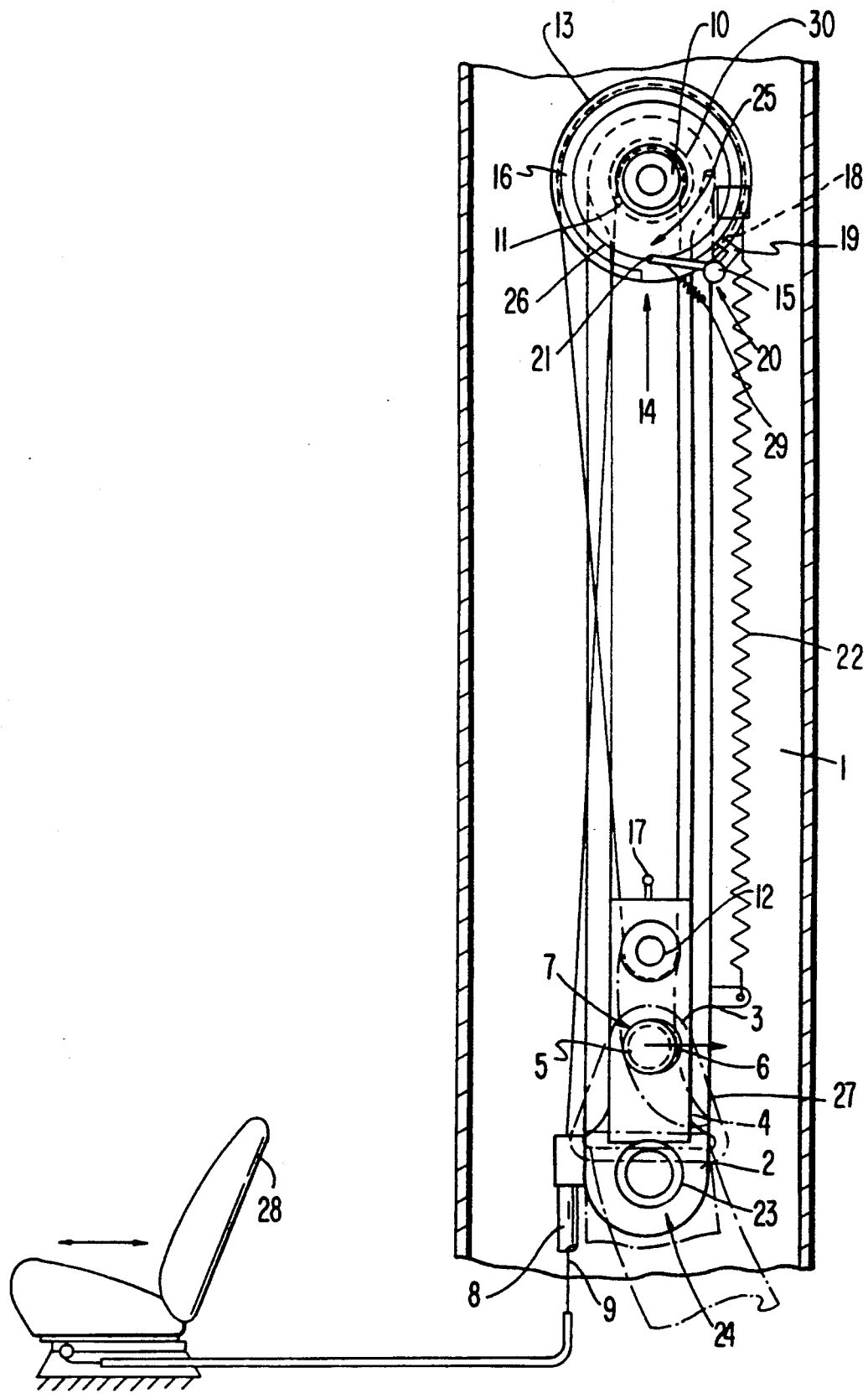

DEVICE FOR THE VERTICAL ADJUSTMENT OF THE UPPER ANCHORAGE OR DEFLECTION POINT OF A SAFETY BELT SYSTEM

BACKGROUND AND SUMMARY OF THE INVENTION

The invention relates to a device for the vertical adjustment of the upper anchorage or deflection point of a safety belt system as a function of the longitudinal position of an associated motor vehicle seat.

In known automatic adjustment devices of this generic kind, a stepped-down but linear displacement of the upper anchorage or deflection point is provided over the entire displacement path of the vehicle seat, with the result that, in the case of seats which can be adjusted rearward a long way, the anchorage or deflection point may be driven into an excessively high position in relation to the size of the body of the belt user, which cannot be made to suit people with a short upper body in particular, and can even become dangerous.

It is an object of the present invention, while retaining the advantages offered by a design of the upper belt anchorage or belt deflection point which is vertically displaceable as a function of the longitudinal position of the seat, to provide a device which permits a vertical position of the belt anchorage or belt deflection point which takes into account the physical realities of the seat user, even with the seat pushed back a long way.

The object is achieved in a device according to the invention, in which the longitudinal position of the seat is transmitted, with deflection, via a cable guided in a sheath and coupled to a slider vertically displaceable in a guide rail between a lower and an upper stop and accommodating an attachment fitting or sash guide. The vertical position of the upper stop is advantageously determined specifically for the particular vehicle. Moreover, it is also possible to cause the upper stop to move further upwards by a specific small amount after the slider has run up against it, in the event of the seat being displaced further rearward, with the result that (for example) a bilinear adjustment function is achieved, which is also achievable in the case of the subject-matter of German Patent document DE-OS 3,539,399 using other means.

Although German Patent document DE-OS 3,713,137 discloses a vertically adjustable belt deflection point in which a cable displacement directed counter to spring force is permitted in the case of a certain load condition, such condition occurs when, in the case of danger, belt tightening is required to bring about a locking engagement of the belt adjustment device in any fixed position of the seat.

In a preferred illustrative embodiment of the present invention, which can be implemented easily, the arrangement comprises a cable pulley at least partially wrapped by the cable and the latter has a guiding groove into which a guide projecting at the top of the slider engages before the upper stop formed by a wall of the guiding groove is reached. Unlocking of the cable pulley is brought about by the guide, so that, in the event of a further rearward displacement of the motor vehicle seat, rotary movement of the cable pulley and withdrawal of the cable are permitted, and the guide slides in the guiding groove, with at least substantial retention of the vertical position of its upper attachment or deflection point.

In a further embodiment of the invention, the unlocking of the cable pulley is brought about via a spring-loaded, two-armed bent lever which is mounted on the guide rail, one arm of which can be acted upon by the guide causing the other arm to be lifted out of a notch of the cable pulley.

Other objects, advantages and novel features of the present invention will become apparent from the following detailed description of the invention when considered in conjunction with the accompanying drawings.

BRIEF DESCRIPTION OF THE DRAWING

FIG. 1 shows a side view of a representative embodiment of an adjustable seat belt deflection device according to the invention.

DETAILED DESCRIPTION OF THE DRAWING

Referring to FIG. 1, a guide rail 2, in which a slider 3 is guided in a vertically displaceable manner, is accommodated in a center pillar 1 of a motor car, not represented in greater detail. A locking catch 4 is pivotably accommodated by the slider 3 and is provided with a projecting threaded bolt 5 which presses through an elongate hole 6 in the slider 3. The threaded bolt coincides with the upper, vertically displaceable belt deflection point 7, which accommodates the sash guide 27 of a 3-point safety belt system. The locking catch 4 is held in the initial position shown by a spring (not shown), and pivots to the side only in the case of the action of a force, due to an accident, in the direction of the arrow indicated and engages in an associated locking opening (not shown) in the narrow side of the guide rail 2.

A cable 9 is guided in a sheath 8 and is fixed in a manner at the front end of a motor vehicle front seat. Cable 9 is deflected a first time by a pulley il situated at the upper attachment point 10 of the guide rail 2, and is guided around a further roller 12 which is mounted in the center of rotation of the locking catch 4. From there, the cable 9 runs to a cable pulley 13, which is part of an arrangement 14 which, from a predetermined rearward seat adjustment onwards, permits, in a manner explained in greater detail below, further cable withdrawal without further vertical displacement of the belt deflection point 7. The cable pulley 13 mounted in the upper attachment point 10 of the guide rail 2, does not take up a full winding of the cable 9, the end of which is anchored via a nipple 15. The cable pulley 13 is furthermore provided with a circumferential guiding groove 16, which is open towards the slider 3 to enable a guide 17 projecting from the top of the latter to engage with the guiding groove 16. On the circumference, the cable pulley 13 has a notch 18, into which an arm 19 of a spring-loaded, two-armed bent lever 20 mounted on the guide rail 2 engages in a locking manner. The other arm 21 of the bent lever 20 is assigned to the outwardly open portion of the guiding groove 16.

In the forward most position of the vehicle seat (not shown), the slider 3 rests, counter to the force of a spring 22, against a lower stop 23, which is formed by the lower attachment point 24 of the guide rail 2. If the vehicle seat is displaced rearwards, a pull is exerted on the cable 9 and, due to the multiple deflection, the slider 3 moves upwards in the manner of a pulley block with a motion reduction, until the guide 17 runs into the guiding groove 16 and up against the inner wall 26 thereof, said wall representing the upper stop 25.

During this procedure, the guide 17 presses the arm 21 upwards, so that the other arm 19 is lifted out of the notch 18, as a result of which the cable pulley 13 is no longer locked. In the event of a further rearward displacement of the motor vehicle seat, the cable pulley 13 is rotated in the counter clockwise direction against the force of a return spring 30. Cable 9 is thereby released and, since the guide 17 is resting in the guiding groove 16 arranged in the form of a circle, the vertical position of the belt deflection point 7 is maintained. It would also be possible, by means of a guiding groove running inwards in a spiral to bring about a specific vertical displacement of the belt deflection point 7 in addition during the rotation of the cable pulley 13.

If the seat is moved forwards again, the cable 9 winds itself back onto the cable pulley 13, which rotates in the clockwise direction, until the arm 19 falls back into the notch 18 and locks the cable pulley 13. This then occupies the illustrated initial position again and, in the event of a further forward displacement of the motor vehicle seat, the guide 17 leaves the guiding groove 16. The slider 3 can thereupon be moved downwards again until the stop 23 brakes a further downward movement.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Device for vertical adjustment of an upper anchorage or deflection point of a safely belt system as a function of the longitudinal movement of an associated motor vehicle seat, said device comprising: a cable transmitting longitudinal movement, with deflection, of the seat; a sheath guiding said cable; a guide rail; said cable adapted to be coupled at a first end to the vehicle seat and coupled at a second end to said guide rail; a slider vertically displaceable on the guide rail between a lower and an upper stop in response to displacement of said cable, said slider accommodating an attachment fitting or sash guide; and means for permitting further cable displacement, directed against a spring force, when the slider runs up against the upper stop, said means coupling the second end of said cable to the guide rail.

2. Device according to claim 1, wherein said means for permitting further cable displacement comprises a cable pulley having a locked and an unlocked mode, being at least partially wrapped by the cable and having a guiding groove adapted to receive a guide projecting at the top of the slider, said guide being adapted to place said cable pulley in its unlocked mode before making contact with an upper stop formed by a wall of the guiding groove so that, in the event of a further displacement of the motor vehicle seat, rotary movement of the cable pulley and withdrawal of cable are permitted, and the guide slides in the guiding groove with at least substantial retention of the vertical position of the upper attachment or deflection point.

3. Device according to claim 2, wherein the unlocking of the cable pulley is brought about via a spring-loaded, two-armed bent lever which is mounted on the guide rail and one arm of which can be acted upon by the guide and the other arm of which can be lifted out of a notch of the cable pulley.

* * * * *